Sept. 3, 1963 J. T. STEWART 3,102,759
JOURNAL BEARING WEAR DETECTOR
Filed May 19, 1960 2 Sheets-Sheet 1
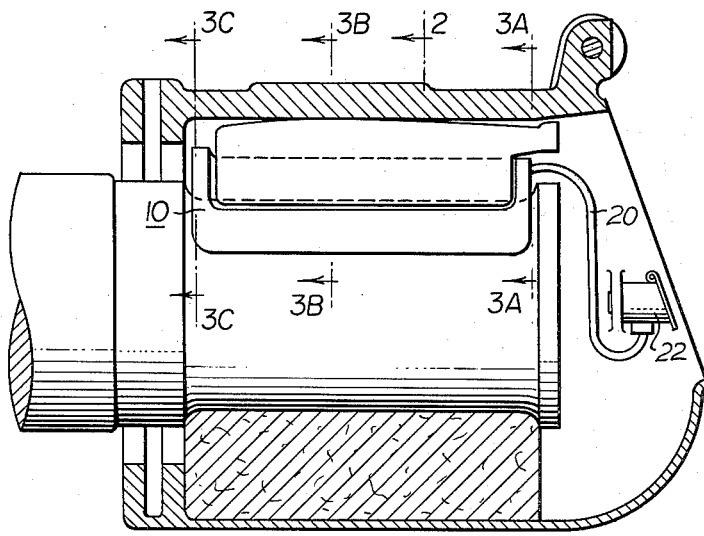
FIG. 1
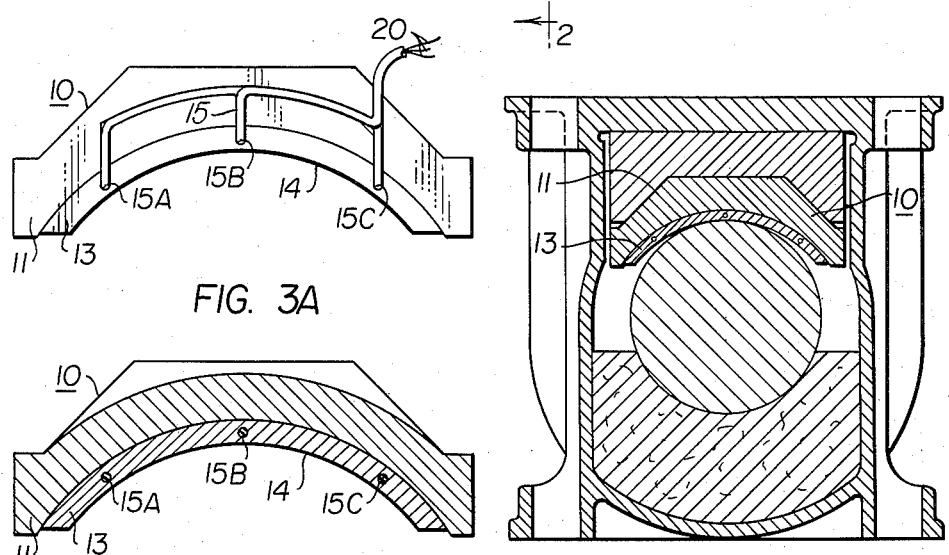
FIG. 3A
FIG. 3B
FIG. 2
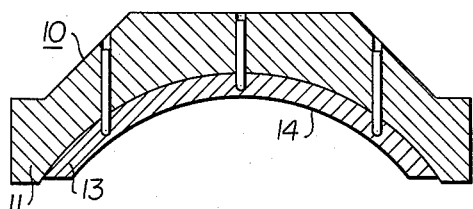
FIG. 3C
INVENTOR.
JOHN T. STEWART
BY Ray S. Pyle
FOR Watts, Edgerton, Pyle & Fisher
ATTORNEYS Sept. 3, 1963 J. T. STEWART 3,102,759
JOURNAL BEARING WEAR DETECTOR
Filed May 19, 1960 2 Sheets-Sheet 2

INVENTOR.
JOHN T. STEWART
BY Ray S. Pyle
FOR Watts, Edgerton, Pyle & Ousler
ATTORNEYS

United States Patent Office

3,102,759
Patented Sept. 3, 1963

3,102,759
JOURNAL BEARING WEAR DETECTOR
John T. Stewart, P.O. Box 6763, Cleveland, Ohio
Filed May 19, 1960, Ser. No. 30,195
4 Claims. (Cl. 308—1)

This invention relates to railroad car journal bearing wear detectors and, more particularly, to the use of insulated wire as a wear detector in railroad car journal bearings.

This invention is a continuation-in-part of Serial No. 819,074 entitled, "Journal Bearing," filed June 9, 1959, now abandoned.

The soft metal wear lining which is bonded to a railroad car journal bearing block is normally hidden from the view of an inspector by the axle collar or by being encased in a cartridge type bearing. In the past there has been no means of inspecting journal bearings to determine the extent to which the lining has been worn without jacking up the car. The procedure adopted by the railroads has been to have the cars sent to the repair tracks periodically for inspection of journal bearings. Here the cars are jacked up and the eight bearings removed individually. They are either returned or are discarded and new bearings inserted.

This invention provides a wear detecting system of such simplicity that it is virtually incapable of malfunctioning and is so low in cost that it can be adopted and will save in the overall cost of operation, rather than adding to such cost.

The copending application describes a method of determining if the amount of wear on a journal bearing lining has exceeded a preselected amount. This method, basically, is to form a plurality of longitudinally extending cavities within the bearing lining a preselected distance from the wear surface of the lining. These cavities are then filled with a liquid indicator which is released into the journal box when the lining has worn to such an extent that the cavity is exposed.

This present invention is similar in principle to the copending application, but embodies the use of insulated wire embedded in the bearing material. When the bearing material has worn to expose the wire and wear off the insulation, an applied current will short circuit through the bearing and an appropriate indicator will indicate such short circuit.

Therefore, one of the principal objects of this invention is to provide a journal bearing with wear indicator.

A more particular object of this invention is the provision of a journal bearing having insulated wire as a wear indicator disposed therein.

A more specialized object of this invention is to provide a journal bearing having insulated wire formed therein which is adapted to provide data to indicate when the bearing has worn a predetermined amount.

Other objects and a fuller understanding of the invention may be had by referring to the following description and claims taken in conjunction with the accompanying drawings, in which:

FIGURE 1 is a section view of a railroad journal box and journal bearing, with an axle positioned therein;

FIGURE 2 is an end view of the axle and bearings, taken as a sectional view through the box along line 2—2 of FIGURE 1;

FIGURE 3A is a sectional view taken along the plane as indicated by the line 3A—3A of FIGURE 1;

FIGURE 3B is a sectional view taken along the plane as indicated by the line 3B—3B of FIGURE 1;

FIGURE 3C is a sectional view taken along the plane as indicated by the line 3C—3C of FIGURE 1;

Figure 4:
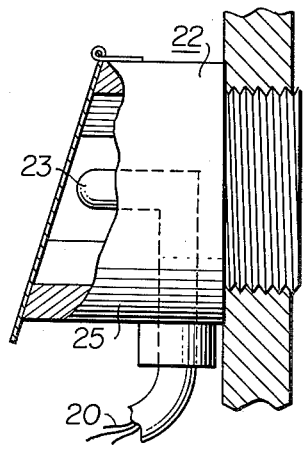
FIGURE 4 is an enlarged detail of the circuit terminal box.

Referring now to the drawings, a journal bearing 10 of conventional size and shape is provided. The journal bearing 10 includes a backing block 11 and a bearing metal lining 13 bonded thereto. The lining 13 has a wear face 14.

The internal structure of the journal bearing, however, is not conventional. An internal passageway system 15 consisting of, in the illustrated embodiment, three cored or drilled holes 15A, 15B, and 15C, extends through the area of the bearing behind the face area most subject to wear. Preferably, the holes are arranged such that they lie about 1/8 of an inch from the wear face 14. Each end wall of the bearing and, preferably, some of the end walls of the supporting block 11 are channeled, as illustrated in FIGURES 3A and 3C. The channels in the inner end wall illustrated in FIGURE 3C terminate dead end; whereas the channels in the outer end wall of FIGURE 3A unite and lead to a terminal 22, shown in FIGURES 1 and 4, which is mounted on the journal box. It must be born in mind that the system 15 may simply be the configuration of metal around insulated wire when such wire is cast in place.

The cavity system 15 is spaced and positioned at the places of greatest wear on the lining 13. Generally, the places of greatest wear on the face are on a vertical centerline passing through the car axle, and areas radially spaced approximately 45 degrees from the vertical on each side of the vertical. The wear will be the greatest on the vertical when the car is at rest or moving slowly at a constant speed, and the wear will be greatest approximately 45 degrees from the vertical when pulling or pushing forces are applied to the wheel trucks such as accelerating and applying the brakes. The end walls will wear by reason of relative lateral shifting of the bearing at the car axle; hence, the location of conductors on these surfaces.

Insulated wires 20 are disposed in the cavity system 15. The wires 20 are collated in the surface channels of the outer bearing surface and lead to a terminal structure 22. The wires 20 are placed in the bottom of the end wall channels and are preferably covered with a protective and retaining material. They are then spaced about 1/8 of an inch from the wearable surface, as described with respect to the wear face 14.

The terminal structure 22 is of any convenient type wherein a terminal member from the collated wires of the system may be held for connection to a suitable testing structure. The housing of the structure 22 is preferably grounded to the journal box, and hence will be electrically connected to the metal of the bearing material. Hence, an electrical testing circuit device attached to the structure 22 with one terminal leading to the wires of the system 15 and the other terminal grounded to the box, it will be completed only when the bearing material has worn to such an extent that the insulation material is worn from the wires to complete an electrical circuit. In the drawings, the wires of the system are connected to a central male fitting 23 of terminal 22, and a housing 25 of the terminal is electrically connected and mounted upon the journal box. A hinged cover cap over the structure is provided for dirt exclusion.

The system 15 may be formed after casting the wear surface material 14 or may be cored and thus cast in place. Furthermore, insulated wire having insulation capable of withstanding over 2000° F. is commercially available in sizes as small as .04 inch O.D. Hence, such wire may be cast in place as the bearing lining is poured. The end grooves are formed to such a depth that the wires 20 may be placed at the bottom of the grooves and be spaced from the surface about ⅛ of an inch corresponding to the depth of the lateral part of the system. Thus, end wear, or surface wear, will cause the desired wire contact by wearing the insulation from the wire after the approved ⅛ of an inch bearing wear has taken place. A lower temperature insulation material, polytetrafluoroethylene, known commercially by the trademark "Teflon," is the preferred material because it is a known excellent lubricating material; and, hence, when the wear surface 14 wears to expose this material, it will not interfere with lubrication while wearing through to the conductor.

Figure 5:
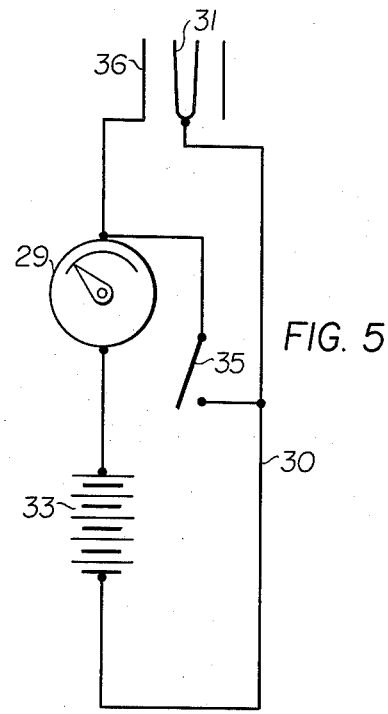
FIGURE 5 is a circuit diagram of an indicating device to indicate lining wear; and, FIGURE 6 is a somewhat schematic partially sectional view of an indicating device.
Figure 6:
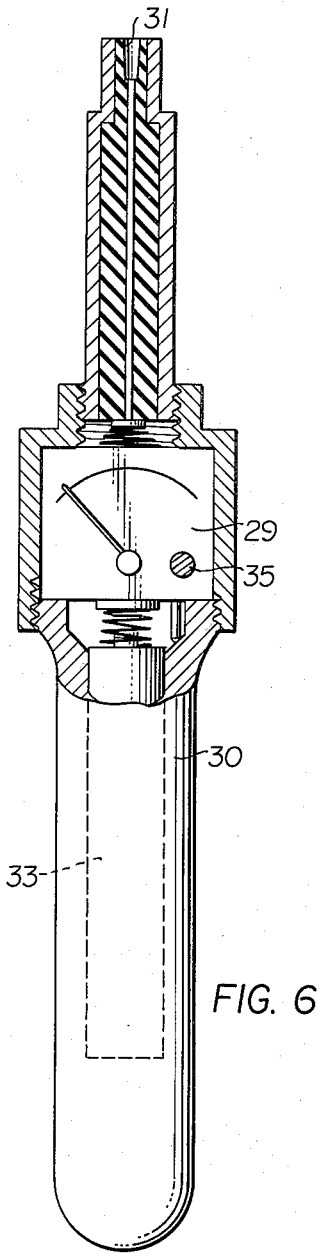

One method of checking to ascertain wear is by the use of a gauge including an ohmmeter or a millivoltmeter. The circuitry of such an indicator is shown in FIGURE 5. An indicator test device housing such circuitry is shown in FIGURE 6. The device 30 has a female socket 31 shaped to plug into the terminal structure 22. The female socket 31 has a wire connecting it to one side of a battery 33. The other side of the battery 33 is connected through an ohmmeter 29 to an outer contact ring 36 which circumscribes the socket 31. The outer contact ring 36 is electrically insulated from the socket 31; thus, there is an open circuit between the female socket 31 and the outer ring 36.

When the bearing lining 13 has not worn down to such an extent that the wire is exposed, and the testing device is used by placing the female socket 31 over on the male fitting 23, and the outer ring 36 in contact with the housing 25, the circuit will be open. The wire 20 still has all of its insulation surrounding it and no current can flow through the wire 20, since it is electrically insulated from the other side of the battery. However, if the bearing wear face 14 or either end wall has worn sufficiently to expose the cavity system 15 and insulation has been worn from the wire 20, the metal of the wire 20 will be in contact with the axle journal and, hence, will be grounded. Then when the test device is used as described above, there will be a closed circuit, and current will flow. The current flows from one terminal of the battery 33 through the female socket 31 and the male fitting 23, the wire 20, the journal, and thence to the bearing and to the housing 25, the outer contact ring 36, the ohmmeter 29, and back to the opposite terminal of the battery 33. Thus, when wear has taken place on the lining 13 sufficient to expose the cavity system 15 and wear the insulation from the wire 20, and when the metering test device is connected to the terminal structure 22, the ohmmeter will show a short circuit with current flowing; and thus a worn bearing can be detected.

A test switch 35 is provided to check the battery and the meter by providing a method of closing the circuit through the meter.

A permanent connection can be afforded between the terminal structure 22, and a central data recording location.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. In combination, a railway journal bearing and an electrical wear detection system, comprising, a bearing having a bearing block, a soft wear metal lining carried by said block with a semi-cylindrical wear face of larger curvature than the circumference of a shaft adapted to be journaled in said bearing, said lining having first and second end walls, said bearing lining having a center line area against which the shaft will wear during rest and stable travel periods, a forward area against which the shaft will wear during application of forces against a load in one direction, and a rearward area against which the shaft will wear during application of forces against a load in the opposite direction, an insulated conductor system embedded in said lining areas and including a plurality of circumferentially spaced, insulated conductors extending axially substantially the full length of said lining between said end walls, said connectors being connected in parallel circuit relation and said conductor system having an external terminal whereby the bearing will have the entire designed strength with no weakness by reason of the detection system and will provide a single test system for the entire wear face and end walls.

2. In combination, a railway journal bearing and an electrical wear detection system, comprising, a bearing having a bearing block, a soft wear metal lining carried by said block with a semi-cylindrical wear face of larger curvature than the circumference of a shaft adapted to be journaled in said bearing, said lining having first and second end walls, said bearing lining having a centerline area against which the shaft will wear during rest and stable travel periods, a forward area against which the shaft will wear during appliaction of forces against a load in one direction, and a rearward area against which the shaft will wear during application of forces against a load in the opposite direction, an insulated conductor system embedded in said lining areas and including a plurality of circumferentially spaced, insulated conductors extending axially substantially the full length of said lining stopping short of said first and second end walls, said conductors being connected in parallel circuit relation, and said conductor system having an external terminal to which said conductors are connected, a portable wear detector device for detection of grounding of said conductor system, said detector device including connecting means electrically connected to said external terminal of said conductor system, said connecting means being disconnectible from said external terminal whereby said device can be associated with a conductor system of another journal bearing, a source of electrical energy connected to ground through said bearing and to said connecting means through a current flow detection meter, whereby wear at any major area of the bearing along any face or end wall will be detected by flow of current from said power source through the conductor system to ground through a worn area in said conductor system.

3. In combination, a railway journal bearing including a backing block and a metal wear lining for engaging a shaft journaled in said bearing, said lining having a semi-cylindrical wear surface and spaced end walls, and an electrical detection system for detecting wear of said lining, said electrical detection system including a first insulated conductor extending longitudinally through said lining and in a vertical plane passing through the axis of said bearing, and second and third insulated conductors extending longitudinally through said lining parallel to said first conductor, said second and third conductors being circumferentially spaced approximately 45° from said first conductor on each side of said vertical plane, said conductors being connected in parallel circuit relation.

4. The combination as claimed in claim 3 wherein portions of each conductor are embedded in said end walls, said conductor portions extending toward said backing block, whereby end wear of said journal bearing can be detected.

References Cited in the file of this patent
UNITED STATES PATENTS

| 1,361,000 | Blain | Dec. 7, 1920 |
| 2,511,918 | Huff | June 20, 1950 |
| 2,616,952 | Lauder | Nov. 4, 1952 |

FOREIGN PATENTS

| 88,470 | Austria | May 26, 1922 |